Figure 5:
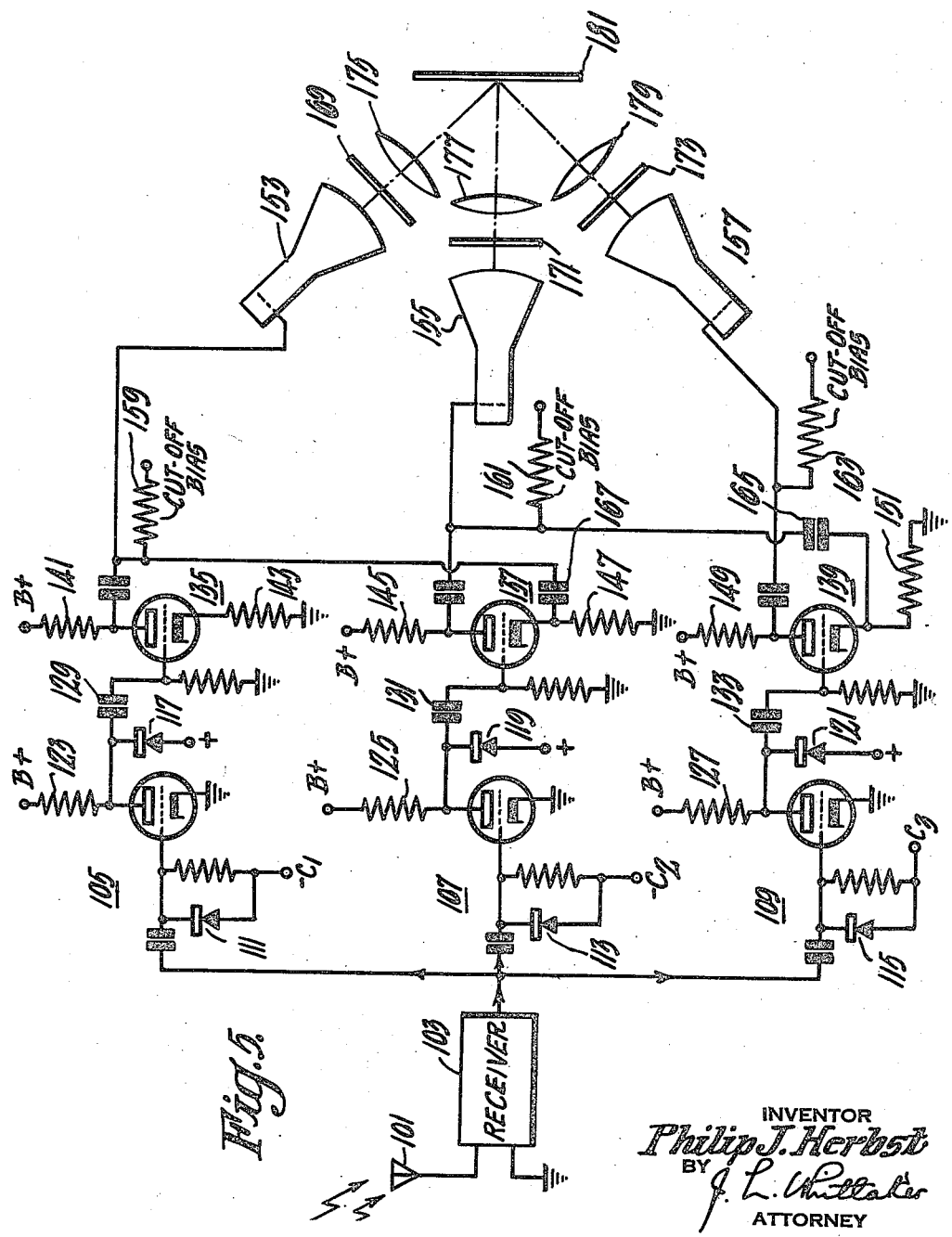

Jan. 7, 1958 P. J. HERBST 2,819,336
COLOR SIGNAL DISPLAY SYSTEM FOR TELERAN OR THE LIKE
Filed Nov. 19, 1951 4 Sheets-Sheet 1
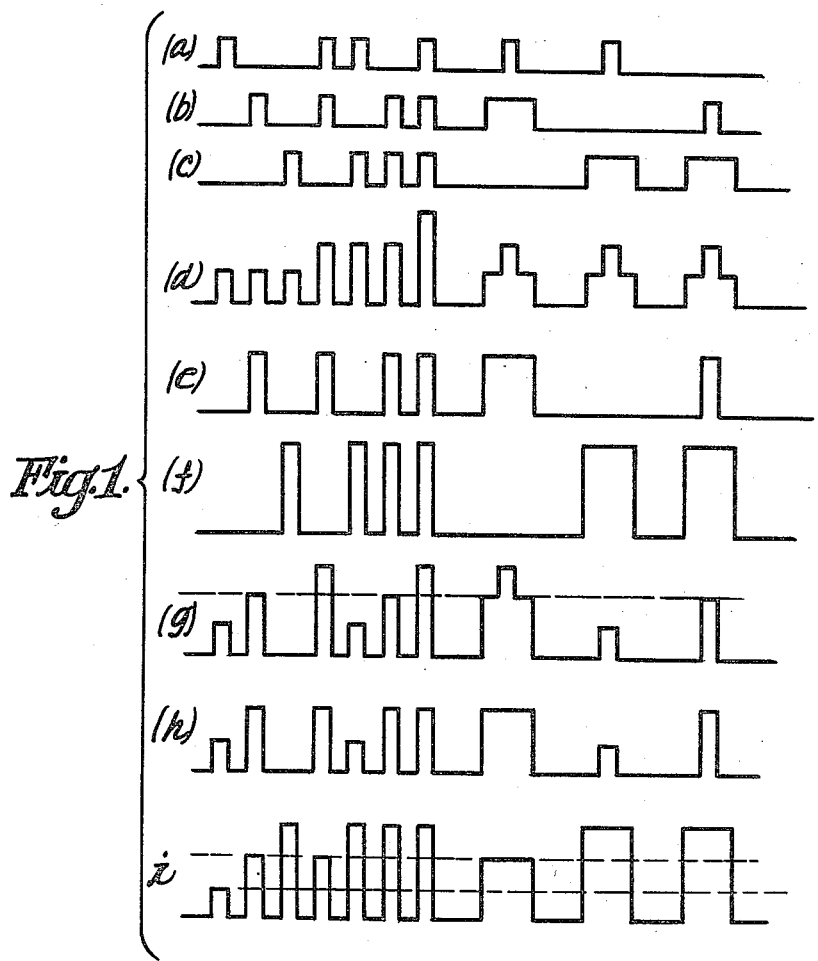
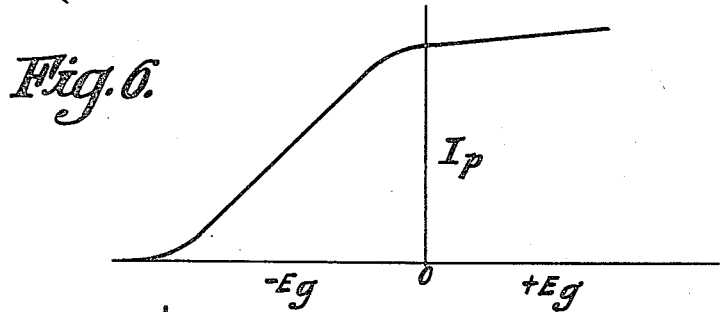
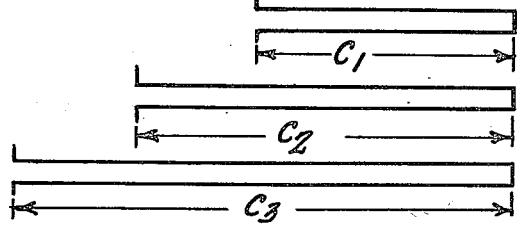
INVENTOR
Philip J. Herbst
BY
ATTORNEY Jan. 7, 1958 P. J. HERBST 2,819,336
COLOR SIGNAL DISPLAY SYSTEM FOR TELERAN OR THE LIKE
Filed Nov. 19, 1951 4 Sheets-Sheet 2
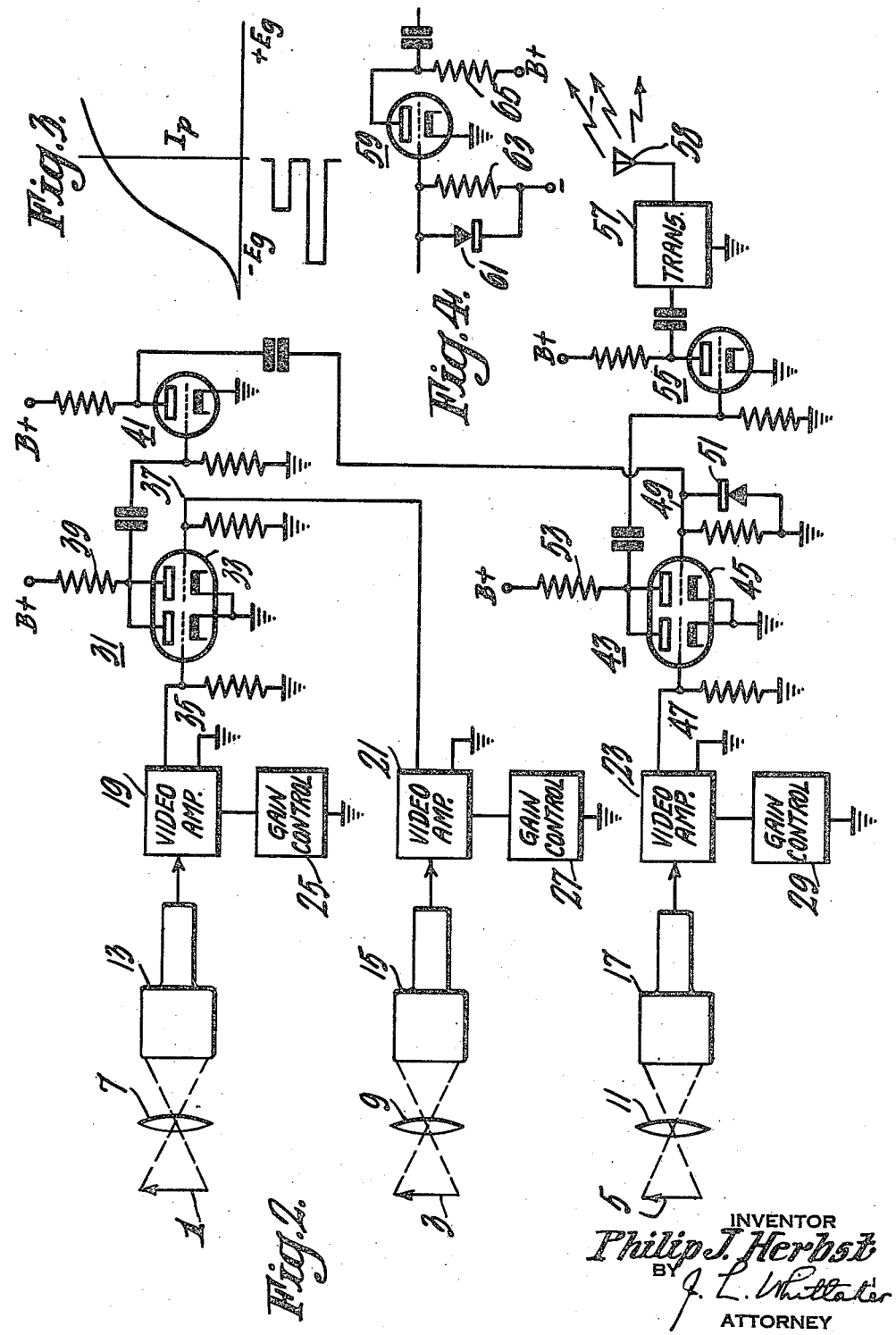
INVENTOR
*Philip J. Herbst*
BY
*J. L. Whittaker*
ATTORNEY Jan. 7, 1958 P. J. HERBST 2,819,336
COLOR SIGNAL DISPLAY SYSTEM FOR TELERAN OR THE LIKE
Filed Nov. 19, 1951 4 Sheets-Sheet 3

INVENTOR
Philip J. Herbst
BY
ATTORNEY

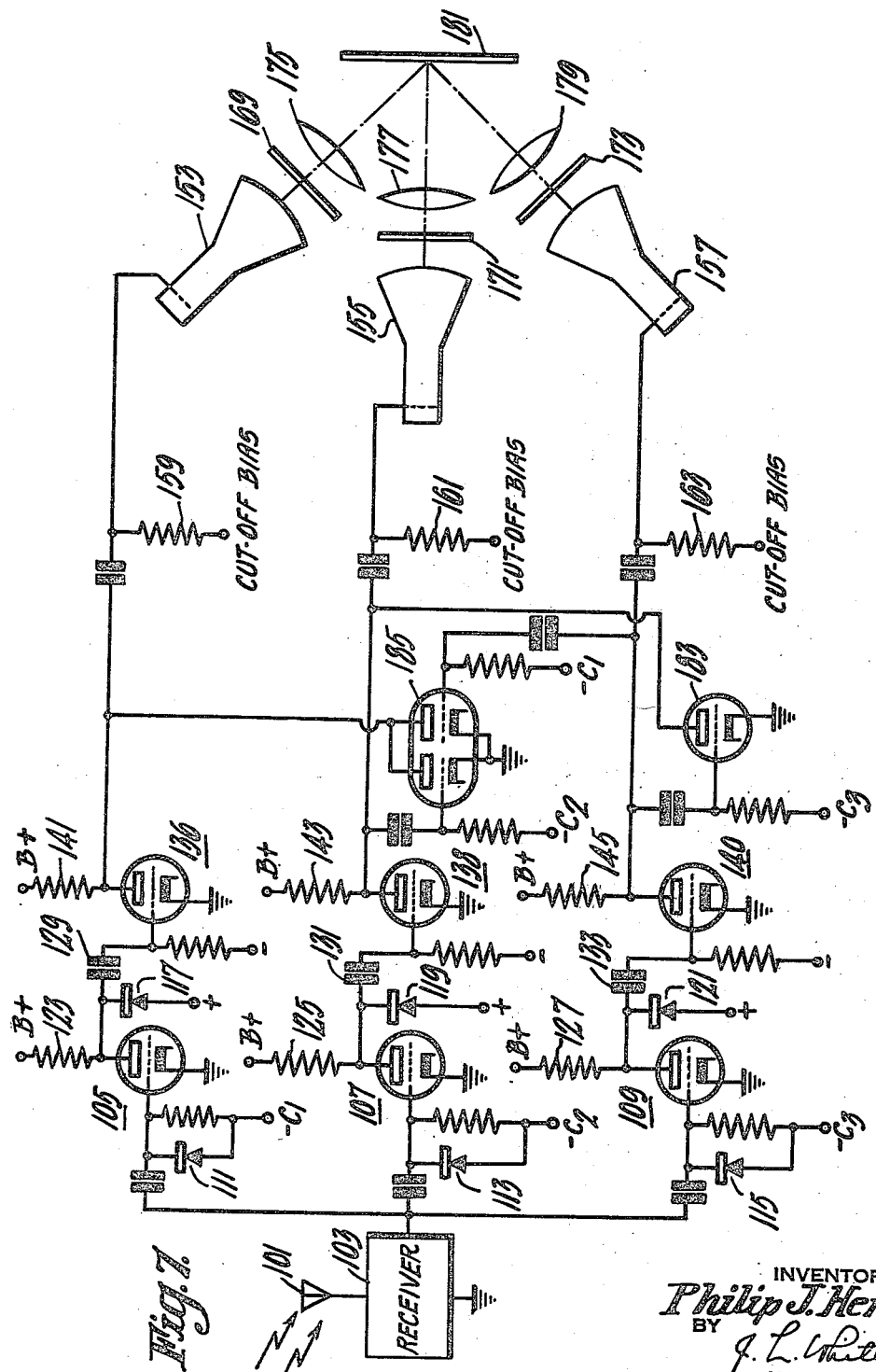

United States Patent Office 2,819,336
Patented Jan. 7, 1958

2,819,336

COLOR SIGNAL DISPLAY SYSTEM FOR TELERAN OR THE LIKE

Philip J. Herbst, Moorestown, N. J., assignor to Radio Corporation of America, a corporation of Delaware Application November 19, 1951, Serial No. 257,114

9 Claims. (Cl. 178—6.8)

This invention relates generally to signal display systems, and particularly to a system in which a plurality of different wave trains, representative of different kinds of signal intelligence, are synthesized into a single composite signal which is transmitted to a remote station and there analyzed to produce a color signal display in which signals corresponding to each of the aforesaid wave trains are characterized by a distinctive color.

A system of this type is particularly adapted to be utilized in a pictorial display radar (Teleran) navigation system. It may be desirable, for example, for radar reflections from hostile aircraft transponder beacon responses from friendly aircraft, and map information of the terrain over which these planes are operating to be observed on a single viewing device. While it is possible to maintain separate transmission channels for conveying each kind of intelligence to a desired location for subsequent color display thereof, it is simpler and more economical structurally and with respect to conservation of the frequency spectrum to combine these different signals into a composite signal for transmission. After reception of the composite signal at a remote location, the composite signal may be separated into its component wave trains each of which may be displayed in a characteristic color. Thus, by way of example, map information may be reproduced in blue color, friendly aircraft data in green, and hostile aircraft data in red.

It is an object of the present invention to provide an improved system for displaying a plurality of different signal trains in different colors to identify them with respect to their sources of origin.

Another object of the invention is to provide a system of the character described which is considerably simpler than previous systems employed.

Another object of the invention is to conserve the amount of frequency spectrum required for such systems.

A further object of the invention is to provide means for affording the transmission of a plurality of different signal trains over a single cable in wire line systems.

According to the instant invention, a plurality of wave trains, each representative of different signal intelligence, are derived which are separately amplified to different amplitude levels. The differently amplified signals are then combined to produce a composite signal, the amplitude of which is limited to a value not in excess of the amplitude of the greatest amplitude component wave train signal. The limited composite signal is then transmitted to a remote receiving station. At the receiving station, the components of the composite signal are separated according to their respective amplitudes by suitable threshold devices and signals corresponding to these component signals are subsequently coupled to color display apparatus whereby only a signal corresponding to the instantaneous maximum signal amplitude is displayed.

It is apparent that the above-mentioned limiting of the composite signal may cause a high level signal to mask simultaneously occurring low level signals. In many systems, such as Teleran, this masking effect may be of little consequence for at least two reasons. First, the present system is intended primarily for utilization in situations wherein the simultaneous occurrence of different signals is relatively infrequent. Secondly, an analysis of the particular situation should be made to determine the information that is of the most importance. In the cited example, Teleran, it appears that it is least desirable to mask hostile aircraft data, hence wave signals representative of this activity may be amplified to the highest level of the different wave trains. Friendly aircraft data appears to be next in order of importance and, as such, may be amplified to an intermediate signal level. The map information then may be amplified an amount substantially less than either hostile or friendly aircraft data. In this manner, data which may be of the greatest importance to an observer is not obscured.

The invention will be described in greater detail with reference to the accompanying drawings in which Figure 1 is a wave diagram useful in understanding the principle of operation of the system of the instant invention; Figure 2 is a circuit diagram, partially in block form, of signal generating apparatus, according to the invention; Figure 3 is an anode current versus grid voltage curve explanatory of a signal limiting operation in the signal generating apparatus of Figure 2; Figure 4 is a schematic circuit diagram of an alternative signal limiting device adapted for use in the signal generating apparatus of Figure 2; Figure 5 is a schematic circuit diagram of a first embodiment, according to the invention, of apparatus for receiving a composite signal transmitted by the signal generating apparatus of Figure 2; Figure 6 is an anode current versus grid voltage curve explanatory of signal limiting action effected in the receiving apparatus of Figure 5; and Figure 7 is a schematic circuit diagram of a second embodiment, according to the invention, of composite signal receiving apparatus.

Similar reference characters are applied to similar elements throughout the drawings.

Referring to Figure 2 of the drawings, separate sources of signal intelligence are represented at 1, 3, and 5. These sources may provide different kinds of information such as was discussed previously with reference to a pictorial display radar (Teleran) system, or some such similar arrangement. The information derived from each source 1, 3, and 5 (representative of a maximum contrast rather than a half-tone display) is focused, by individual optical systems 7, 9, and 11, onto photosensitive surfaces of television camera tubes 13, 15, and 17 each respectively associated with one of the signal sources 1, 3, and 5. The different video signals obtained from each of the television camera tubes 13, 15, and 17 are assumed to be identical in amplitude and may be as shown, respectively, in Figures 1–(*a*), 1–(*b*), and 1–(*c*). It may be seen that direct mixing of the video signals for producing a composite signal as shown in Figure 1–(*d*) does not afford a composite signal from which a signal source later may be identified. As a result, the video signal trains are amplified in separate amplifiers 19, 21, and 23, each of which has respectively associated therewith a separate gain control 25, 27, and 29.

In the present description it will be assumed that the gains of the different amplifiers are adjusted to produce output signals having a 1:2:3 amplitude relationship. In other words, video signals derived from one signal source 1 are amplified by a given factor; video signals attributable to and derived from a second source 3 are amplified twice that amount; and video signals obtained from a third signal source 5 are amplified by a factor of three. The output wave trains from the amplifiers 19, 21, and 23 are then as shown, respectively, in Figures 1–(*a*), 1–(*e*), and 1–(*f*).

Output signals from two of the amplifiers 19 and 21 are applied to a first signal combining circuit 31, which preferably comprises a double triode 33 having separately excited input circuits 35 and 37 connected thereto. The different video signals shown in Figures 1–(a) and 1–(e) are applied to the tube and are developed in combination across a common plate load resistor 39 to produce a first combination signal, shown in Figure 1–(g), which is capacitively coupled to a limiter 41. The value of plate potential applied to the limiter 41 is chosen to provide a selected grid excursion between zero bias and plate current cutoff. In Figure 3, it may be seen that a signal from just one of the amplifiers, either 19 or 21, does not drive the limiter to cutoff whereas the simultaneous occurrence of both signals does cause plate current cutoff. The limiter 41 then operates to limit the amplitude of the first combination signal to the amplitude of the double height pulse and produces a combination signal as shown in Figure 1–(h).

The first combination signal (Figure 1–(g)) and the remaining video signal (Figure 1–(f)) coupled from the amplifier 23, are applied to a second signal combining circuit 43 which also comprises a double triode 45 having separate input circuits 47 and 49 to which these signals are applied. The input circuit 49 to which the first combination signal is applied includes a crystal diode 51 for maintaining the D.-C. level thereof. While a crystal diode is herein shown, it should be understood that a thermionic or other properly disposed rectifier device may be employed alternatively. A second combination signal is then developed across a common combining circuit load resistor 53 and is coupled to a second limiter 55, operating in a manner similar to that of the first limiter 41, for limiting the amplitude of the second combination signal to the amplitude of the triple height pulse. The second combination, or composite, signal is shown in Figure 1–(i) and is coupled to and modulates a transmitter 57, in this instance a television transmitter, the output of which may be radiated from an antenna 58 non-directional in characteristic.

A more flexible type of limiter circuit 59 is disclosed with reference to Figure 4 wherein a diode 61 is connected in shunt with the grid input resistor 63 to a triode limiter. The rectifying action of the diode 61 serves to set the D.-C. level on the grid of the limiter. The limiter output circuit comprises a resistance load device 65 across which a signal may be developed for further utilization. The advantage of the instant circuit is that it affords greater freedom in the selection of tube types and permits adjustment of the cut-off level by selection of a desired bias potential.

Referring to Figure 5, the transmitted carrier signal, modulated by the composite signal, is received at a remote receiving station and is coupled from a receiving antenna 101 to a receiver unit 103, the output of which effectively reproduces the composite wave signal of Figure 1–(i). Simultaneously, the composite signal is applied to three different limiter devices 105, 107, and 109, each of which is biased to a different level. The D.-C. level for each limiter input stage is restored, respectively, by crystal (or other) diodes 111, 113, and 115. Assuming, for example, that the triple height pulse is the instantaneous portion of the composite signal being applied to the limiters, it is apparent, referring to Figure 6, that the pulse passes all three thresholds —$C_1$, —$C_2$, and —$C_3$. Crystal diodes 117, 119, and 121 in the plate circuits of each limiter 105, 107, and 109 each prevent the plate potential of the tube associated therewith from falling below a predetermined value.

The signals passing the different thresholds are developed across different load resistors 123, 125, and 127 and coupled by means of different coupling capacitors 129, 131, and 133 to separate amplifiers 135, 137, and 139. Oppositely poled signals are produced which are developed across different resistors 141 and 143, 145 and 147, 149 and 151 in the plate and cathode circuits of each amplifier 135, 137, and 139. Capacitively coupled to the plate circuit of each amplifier are different cathode ray devices 153, 155, and 157, all of which electron beam currents are normally maintained in cut-off by negative bias potentials applied to different bias resistors 159, 161, and 163. In order that more than one color is not displayed in response to the triple height pulse passing all three thresholds, channel intercoupling means are provided for instantaneously rendering inoperative all signal conveying channels except that one which is conveying the signal passing the highest threshold.

The channel intercoupling means comprises a pair of capacitors 165 and 167, one of the capacitors 165 being connected between the cathode resistor 151 of the high level threshold amplifier 139 and the beam control electrode of the intermediate level cathode ray device 155, the second capacitor 167 being connected between the cathode resistor 147 of the intermediate level threshold amplifier 137 and the beam control electrode of the low level cathode ray device 153. The tendency of signals coupled through the low and intermediate threshold channels to drive the cathode ray devices 153 and 155 associated therewith into conduction is opposed by the simultaneous application to each of the cathode ray devices of oppositely poled intercoupled signals. Thus, only one device 157 is rendered operative at a given instant.

If the signal instantaneously applied to the limiters 105, 107, and 109 happens to be a double height pulse, it is obvious that no signal passes the highest threshold —$C_3$, hence the cathode ray device 157 in that signal channel remains cutoff. The low level channel is maintained in cutoff by means of intercoupling through the capacitor 167. Again only one signal channel is effective, in this instance the intermediate channel cathode ray device 155 conducting. It is apparent that a single height pulse passes only the threshold —$C_1$. Since no signals are conveyed in the intermediate and high level channels, no signals are intercoupled to oppose conduction in the low level channel cathode ray device 153.

In order that the signals thus separated may be displayed in distinctive colors, different color filters 169, 171, and 173 are provided which are interposed between each display device and different optical systems 175, 177 and 179 utilized for focusing the different visual displays onto a single viewing surface 181. The color filters 169, 171, and 173 may be chosen to pass only blue, green, and red colors, respectively. As an alternative arrangement, however, the cathode ray devices may be kinescopes which produce different color images on their screens. This type of display apparatus obviates the need for color filters as utilized above. It is also apparent that a single kinescope having a plurality of different electron guns and a multi-color dot type screen may be utilized to provide the same end result as obtained in the above-described example. The single kinescope, for direct viewing, not only dispenses with the need for color filters but also obviates the need for the associated optical systems.

In Figure 7, an alternative arrangement for receiving the transmitted composite signal is shown wherein a plate current mixing operation is utilized for selectively displaying components of the composite video signal in characteristic colors.

The initial operation of the instant receiving apparatus is similar to the operation of the apparatus described with respect to Figure 5. The multi-level composite video signal (again assuming that the portion of the composite signal at a given instant is of triple amplitude) simultaneously passes the thresholds of the three different limiter stages 105, 107, and 109. The thresholded signals are then amplified in different amplifiers 136, 138 and 140 and output signals corresponding to the input signals are developed across separate plate load resistors 141, 143, and 145. Normally the amplifier output signals thus developed would be sufficient to drive the separate kinescopes 153, 155, and 157 associated with each signal channel out of cutoff. It is desirable, however, that only a single signal channel be effective at a given instant, that channel being the one conveying a signal corresponding to the highest amplitude signal passed by the limiters 105, 107, and 109.

The signal conveyed in the high level channel and developed as a positive going signal across resistor 145 is coupled to the grid electrode of a kinescope 157 coupled thereto. The signal drives the tube into conduction such that a visual signal indication is produced. The indication obtained is filtered by a color filter 173 and optically focused onto a viewing surface 181. Simultaneously, the signal driving the kinescope 157 into conduction is applied to an inverter amplifier 183, the anode of which is connected to the anode electrode of the intermediate level channel amplifier 138, and is also applied to one grid of a double triode 185. At the same time, however, the signal developed across the load resistor 143 of the intermediate level amplifier 138 tends to drive the kinescope 155 coupled thereto out of cutoff. Since the intermediate amplifier 138 and the inverter amplifier 183 have commonly connected anodes, their space currents are supplied by a common load resistor 143. Also, since the current through one amplifier 138 is decreasing while the current through the other amplifier 183 is increasing, it is apparent that the resulting signal developed across the resistor 143 is not sufficient to drive the intermediate channel kinescope 155 out of cutoff and cause conduction therein.

Similarly, the grid electrode of the remaining half of the double triode 185 is capacitively coupled to the output circuit of the intermediate channel amplifier 138. The anodes of the double triode are commonly connected and are supplied with space current through the load resistor 141 of the low level channel amplifier 136. The double triode section serves a purpose similar to the above described inverter amplifier 183 by preventing conduction in the low level signal channel kinescope 153. It is obvious that the receiver system operation is relatively simple when the composite signal component is of single or double height. In the case of the double height pulse, the high level channel is unaffected (since no signal passes the relatively high $-C_3$ threshold), the output from the low level channel is suppressed by current mixing action analogous to the manner described above, and only the intermediate level channel is instantaneously effective in producing a display. For low level signals (single height pulses) the receiver apparatus operates as if the higher level channels were not present.

From the foregoing description, it may be seen that the instant invention affords several distinct advantages. The portion of the frequency spectrum necessary for practising the system of the invention is relatively narrow when the amount of information that may be conveyed thereby is considered. As well as the economies in frequency spectrum, the structural economy in incorporating many different kinds of signal intelligence into a single composite signal for transmission is obvious. This is true not only in consideration of the amount of receiver circuitry necessary, but may also be an important factor when transmitting information over a single cable in wire line systems. Although the invention has been disclosed and described with reference to a Teleran system, it is readily apparent that the system may be practised in various other forms.

What is claimed is:

1. A system for generating a plurality of trains of signals at a first location and displaying said signals in different colors at a second location to identify them with respect to their sources of origin comprising; at said first location, a plurality of separate sources of signals, means for amplifying said signals to different respective amplitude levels determined by said sources of origin, means for combining said differently amplified signal trains into a composite signal having corresponding levels of component signal amplitude, and means for transmitting said composite signal to said second location; at said second location, means for receiving said composite signal, means for separating the different components of said composite signal according to their respective amplitudes, individual signal channels for said separated component signals, means intercoupling said channels and control means responsive to signals conveyed in said individual channels for instantaneously rendering effective only one of said signal channels, all other signal channels being simultaneously disabled, and color display apparatus coupled to said channels for displaying signals conveyed therein in a characteristic color.

2. A system as claimed in claim 1 which includes means coupled between said combining means and said transmitter for limiting the amplitude of said composite signal to a value not in excess of the amplitude of the highest amplitude component signal.

3. Signal generating apparatus comprising, a plurality of separate sources of signals, a plurality of means for amplifying said signals to different respective amplitude levels determined by the source of origin of said signals, a first signal combining means coupled to at least two of said amplifying means responsive to at least two of said trains of amplified signals for producing a first combination signal including said two signal trains, a second signal combining means coupled to said first signal combining means at least one other of said amplifying means and responsive to said first combination signal and at least one other of said amplified signal trains for producing a second combination signal including said first combination signal and said other signal train, means coupled to said signal combining means to limit the amplitude of said combination signals to an amplitude no greater than the highest amplitude component signal train, and means for transmitting said second combination signal.

4. Apparatus as claimed in claim 3 wherein said means for amplifying said signal trains to different respective levels includes a separate amplifier for amplifying each of said signal trains, the gain of each of said amplifiers being controlled by individual gain-control means.

5. Apparatus as claimed in claim 3 including bias means associated with said limiter means for limiting the amplitude of signals derived therefrom.

6. In a system for displaying a plurality of trains of signals in different colors to identify them with respect to their sources of origin, apparatus for receiving a composite signal composed of a plurality of signal trains having different respective amplitude levels comprising, means for separating different components of said composite signal according to their respective amplitudes, individual signal conveying channels coupled to said separating means each of which includes an amplifier and a normally cut-off cathode ray color display device for said separated signals, means intercoupling said signal conveying channels, and control means responsive to signals conveyed in said channels for instantaneously rendering effective only one of said cathode ray devices and for disabling all the other cathode ray devices.

7. Apparatus as claimed in claim 6 wherein said channel intercoupling means includes an electron discharge device coupled between different ones of said amplifiers, the space current of one of said amplifiers and said discharge device being supplied through a common impedance element.

8. A system for generating a plurality of trains of signals at a first location and displaying said signals in different colors at a second location to identify them with respect to their sources of origin comprising; at said first location, a plurality of separate sources of signals, means for converting said signals into corresponding television video signals, means for amplifying said video signals to different respective amplitude levels determined by said sources of origin, means for combining said differently amplified video signals into a composite video signal having corresponding levels of component video signal amplitude, and means for transmitting said composite signal to said second location; at said second location, means for receiving said composite television signal, means for separating the different video components of said composite signal in accordance with their respective amplitudes, individual signal channels for said separated component signals, means intercoupling said channels and control means responsive to video signals conveyed in said individual channels for instantaneously rendering effective only one of said signal channels and for simultaneously disabling all the other signal channels inoperative, and color display apparatus coupled to said channels and responsive to signals produced thereby for displaying said signals in a characteristic color.

9. A system as claimed in claim 8 including means coupled between said combining means and said transmitter for limiting the amplitude of said composite video signal to a value not in excess of the amplitude of the highest amplitude component signal.

References Cited in the file of this patent

UNITED STATES PATENTS

| | | |
|---|---|---|
| 2,428,351 | Ayres | Oct. 7, 1947 |
| 2,446,248 | Shrader | Aug. 3, 1948 |
| 2,517,752 | Wolff | Aug. 8, 1950 |
| 2,520,600 | Jones | Aug. 29, 1950 |
| 2,528,202 | Wolff | Oct. 31, 1950 |
| 2,593,925 | Sheldon | Apr. 22, 1952 |
| 2,605,360 | Trevor | July 29, 1952 |
| 2,657,253 | Bedford | Oct. 27, 1953 |
| 2,664,462 | Bedford | Dec. 29, 1953 |